United States Patent

[11] 3,534,807

[72] Inventor Joseph W. Bracken, Jr.
 Redford Township, Michigan
[21] Appl. No. 774,985
[22] Filed Nov. 12, 1968
[45] Patented Oct. 20, 1970
[73] Assignee General Motors Corporation
 Detroit, Michigan
 a corporation of Delaware

[54] REGENERATOR RIM SPACER
 5 Claims, 5 Drawing Figs.
[52] U.S. Cl. .................................................. 165/9,
 64/11, 64/27, 74/443, 74/446, 165/10
[51] Int. Cl. .......................................... F28d 19/04,
 F16h 55/14
[50] Field of Search .......................................... 165/8, 10,
 9; 64/15, 27, 11; 74/443, 446

[56] References Cited
 UNITED STATES PATENTS
 2,562,166 7/1951 Bendall ........................ 74/233
 3,363,478 1/1968 Lanning ...................... 74/446
 3,430,687 3/1969 Wardale ..................... 165/10(X)
 FOREIGN PATENTS
 975,776 11/1964 Great Britain ................ 165/8

Primary Examiner—Albert W. Davis, Jr.
Attorneys—Paul Fitzpatrick and E. W. Christen ABSTRACT: An axial-flow rotary regenerator matrix includes an outer sealing ring or outer rim. A radially yieldable structure is disposed between this sealing ring or rim and the heat transfer body of the matrix to prevent failures resulting from stresses caused by unequal expansion of the heat transfer body and the rim or sealing ring. The yieldable structure is made up of two interdigitated corrugated strips which may slide radially one within the other.

Patented Oct. 20, 1970

3,534,807

INVENTOR.
Joseph W. Bracken, Jr.
BY
Paul Fitzpatrick
ATTORNEY 3,534,807

REGENERATOR RIM SPACER

SPECIFICATION

My invention relates to rotary regenerators, and particularly to improvements in the matrix or heat transfer element of such regenerators. The matrices of rotary regenerators such as those used as regenerators in gas turbine engines reach high temperatures of the order of 1,000°F. and are cycled between cool and hot conditions when the engine is started and stopped. Either because of differences in temperature of the parts of the matrix or different coefficients of expansion, there may be differences in the rate of expansion of parts of the matrix which set up stresses in the matrix which may result in failure, or partial failure, of the structure of the matrix.

For example, an axial-flow regenerator matrix of known type includes a heat transfer disk made up of alternating flat and corrugated metal strips wrapped spirally around a hub to provide passages for flow of air or gas through the disk parallel to its axis of rotation. The disk expands and contracts between cold and hot conditions and, additionally, is considerably hotter in operation at one face than at the other, so that the outer surface of the matrix heat transfer body assumes a taper. Such a heat transfer body ordinarily is associated with an outer rim constituting a solid band around the matrix or with sealing rings which are solid rings around the periphery of the matrix. In many cases these operate at a lower temperature than the heat transfer body and may operate at nearly uniform temperature from one face of the matrix to the other. The resulting differences in expansion and distortions of the parts result in compressive stresses on the material of the matrix heat transfer body and have been observed to cause cracking.

Also, where metal parts are associated with a ceramic matrix, there is a very considerable diversity of coefficients of expansion between the ceramic and metal parts.

In either case, it may be highly desirable to provide a connection between parts which expand differently which allows for relative radial expansion or distortion without any significant stress but which provides for alignment of, and some transmission of torque between, the parts. Thus, if the matrix is rotated by a central shaft and seals bear against the outer rim, there needs to be a connection to assure joint rotation of the parts. In other cases, the connection may be between the heat transfer body of the matrix and a rim or driving gear from which torque is transmitted to rotate the matrix.

The principal purpose of my invention is to provide a readily fabricated, reliable, and inexpensive connection between relatively expansible parts of the matrix. This purpose is achieved by provision of two corrugated sheets or strips with the corrugations extending generally parallel to the axis of rotation and with the two strips interfitting so that the peaks of the corrugations of each strip enter into the valleys between the corrugations of the other strip, thus providing a sort of spline connection between these two parts which allows relative radial expansion but provides a centering action between the rim and the heat transfer body.

In the illustrated embodiments, the connection is on the exterior of an axial-flow matrix. Clearly, however, it is applicable to radial-flow matrices and to location at the inside of an annular matrix structure.

The principal object of my invention is to improve the utility and durability of regenerative matrices. Other objects are to improve the utility of regenerators, to render more feasible the use of regenerators in gas turbine engines, and to provide regenerator matrices having suitable provision for relative expansion of parts having different temperatures in service or different coefficients of thermal expansion. A further object of my invention is to provide a radially expansible connection between inner and outer parts which centers these relative to each other and provides for transmission of torque, but allows for relative expansion to a desired extent without undue friction or binding.

I consider myself to have invented a process of manufacture of a structure of the type referred to above, but such invention in the manufacture forms the subject of my companion U.S. patent application for Matrix Spacer Manufacture Ser. No. 778,398 filed November 25, 1968.

The nature of my present invention and its advantages will be clear to those skilled in the art from the following detailed description of preferred embodiments of the invention and the accompanying drawings thereof.

Figure 1:
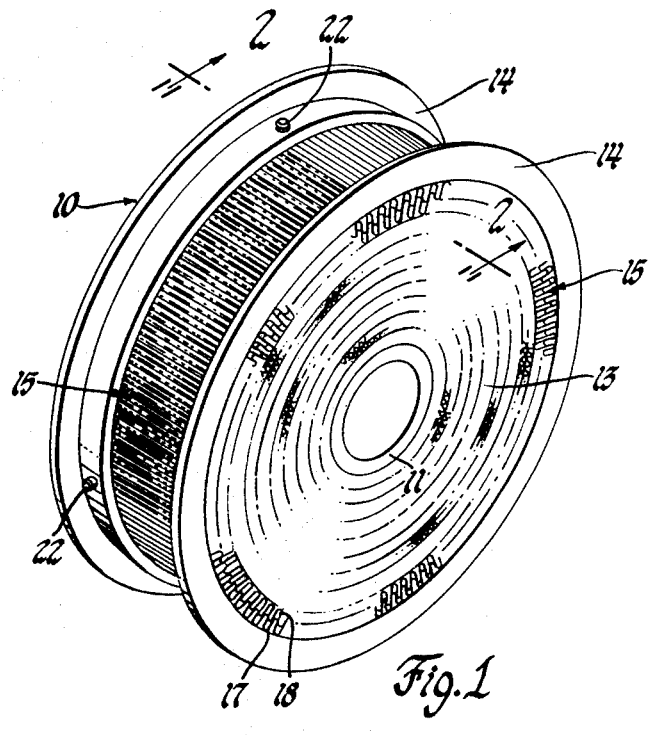
FIG. 1 is an axonometric view of an axial-flow regenerator matrix.

Referring to the drawings, FIG. 1 shows an axial-flow regenerator matrix which, except for my invention to be described, may be of conventional or known type suited for use in regenerators of the sort shown in U.S. Pat. No. 3,368,611 of Bracken et al for Rotary Regenerator Seal with High Pressure Fluid Recovery, February 13, 1968.

The matrix 10 of FIG. 1 comprises a cylindrical hub 11 which may include means (not shown) for connecting the hub to a matrix driving shaft such as those disclosed in U.S. Pat. No. 3,476,173. The matrix comprises a cylindrical or disk-shaped body 13 of heat transfer material which preferably is defined by alternating flat and corrugated strips of thin sheet metal wrapped spirally around the hub so as to define passages extending generally axially of the matrix through the corrugations. The matrix also includes two seal rings 14, each of which is an L-section band extending around the periphery of the heat transfer material and spaced from it (see also FIG. 2).

The matrix also includes an interconnecting structure 15 coupling the heat transfer body to the rings 14. Rings 14 provide a surface on their outer radial faces for engagement with seals which define the boundaries of the motive fluid path through the matrix, as is understood by those skilled in the art and shown in the aforementioned patents. It will be understood, of course, that the interconnecting structure 15 is shown to larger than normal scale in FIG. 1 and the heat transfer body is more grossly enlarged. This is a very fine structure, and thus the rendition of the drawings is not to scale. Referring also to the other FIGS. of the drawing, it will be seen that the interconnecting structure 15 comprises a radially outer corrugated strip or sheet 17 and a radially inner corrugated sheet or strip 18. Preferably, the corrugations are of approximately the configuration shown in FIG. 4, with rather deep corrugations having substantially parallel side walls joined by arcuate return bends so that the sheets have peaks on each corrugation adapted to extend into the valleys of the other corrugated sheet and to slide radially without undue effort, as indicated by the broken lines in FIG. 4. There is preferably a slight deformation or elastic squeezing together of the corrugations in parts 17 and 18 where they interengage, or at least a rubbing fit between them to minimize leakage. However, a looser fit can be satisfactory if torque transmitted causes the corrugations to abut at one side of each loop.

The outer corrugated sheet 17 is brazed at the outer peaks of the corrugations at 19 to the exterior structure and the inner corrugated sheet is brazed at 21 to the metal heat transfer body 13 at each peak of the corrugations. The rubbing or mating surfaces of the two sheets are coated during the brazing operation to prevent any brazing between them.

Figure 2:
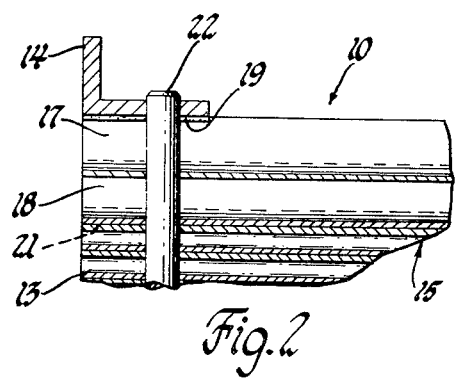
FIG. 2 is a detailed sectional view to a larger scale taken on a radial plane indicated by the line 2–2 in FIG. 1.

The seal rings 14, as shown in FIG. 2, are connected to the heat transfer body 13 by several circumferentially spaced radial pins 22 (FIGS. 1 and 2) which are slidable either in the ring 14 or in the body so that they do not prevent relative expansion. The purpose of pins 22 is to prevent axial shifting of the seal rings and sheet 17 relative to the sheet 18 and heat transfer body. With some types of regenerator structure, there will be no need to provide anything in the matrix itself to prevent such relative shifting.

Figure 3:
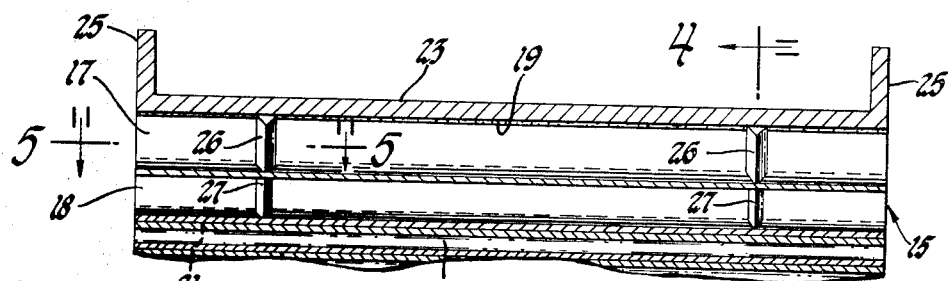
FIG. 3 is a view similar to FIG. 2 illustrating a second form of the invention.
Figure 4:
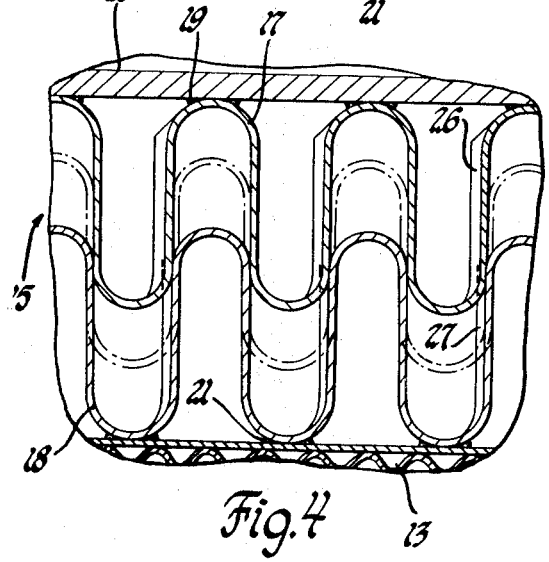
FIG. 4 is a still further enlarged sectional view taken perpendicular to the axis of the matrix as indicated by the line 4–4 in FIG. 3.

FIGS. 3 and 4 show a matrix structure in which a rim 23 extends across the entire axial length of the outer periphery of the matrix, rim 23 having flanges 25 which serve as sealing rings similar to the rings 14 of FIG. 1. If it is desired to have the seal work against the matrix itself (or, in this case, the interconnecting structure 15) the flanges 25 may be omitted.

Figure 5:
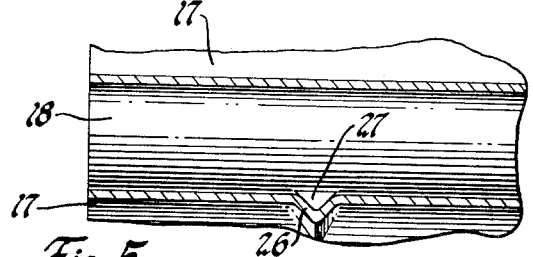
FIG. 5 is a fragmentary sectional view taken on the plane indicated by the line 5–5 in FIG. 3.

FIGS. 3 and 4 show an alternative method of interlocking the sheets 17 and 18 to prevent relative shifting axially of the matrix. In this form small radial ridges or keys 26 and 27 are formed on one side of the corrugation of the sheets 17 and 18, respectively. The radial ridges 27 lodge in and may slide radially in the ways defined by the inner face of ridges 26, as indicated in FIGS. 3, 4 and 5. One or more sets of such ridges may be provided and, as will be clear, they serve as a keying arrangement to prevent axial shifting of the two corrugated sheets 17 and 18. The ridges 26 and 27 may be formed on the sheets as a part of the process of corrugating. Ridges may be on all corrugations, or some may be skipped.

Obviously, the ridges 26 and 27 may be used with the rim extending entirely across the matrix or with the separate seal rings as shown in FIG. 1. Likewise, the pins 22 may be used with the rim 23 as well as with the rings 14.

When the matrix is in service, it has one hot side and one relatively cool side and, thus, the radial expansion of the heat transfer material is greater at the hot face of the matrix than it is at the cool face. Also, in the particular installation considered, the rim 23 is exposed to compressor discharge air and is much cooler than the heat transfer body. The differential expansion, as well as any relative expansion between the body of the matrix and the rim, is easily accommodated by sliding of the two corrugated sheets 17 and 18 within each other. Since these interlock more or less as splines, they serve to center the rim or other external structure on the matrix body and, since the corrugations abut each other, they prevent leakage due to flow circumferentially of the matrix through the interconnecting structure. In the illustrated matrix two feet in diameter, of 304 L stainless steel, the radial movement between parts 17 and 18 is about 0.02 inch at the cold face of the matrix and about 0.14 inch at the hot face. In this case, the corrugations in sheets 17 and 18 are about 0.32 inch deep.

A structure such as that shown in these FIGS. can be used to connect a matrix to a rim which includes a driving gear to rotate the matrix, or to a driving gear whether or not it is a part of a rim of the matrix.

It will be understood that the sheets 17 and 18 may constitute a continuous ring or a ring with one or more gaps if desired. Where it is desired to use the structure according to my invention to connect a metal rim or gear to the periphery of a ceramic matrix, the connection between the inner sheet 18 and the matrix will not be accomplished by brazing but may be accomplished in any other suitable manner as, for example, by lodging the corrugations of the sheet 18 in axially-extending flutes or grooves in the periphery of the ceramic heat transfer material.

It will be seen that the structure according to my invention is readily adapted to provide a centering action and to transmit driving torque between the parts of the matrix while providing for relative expansion or distortion. The fabrication of the structure is relatively simple, the major problem being that of maintaining proper contact between the corrugated sheets of the interconnecting structure and the parts of the matrix with which they are to be connected during the brazing operation. This is simply and adequately taken care of by the process which forms the subject matter of my companion application Ser. No. 778,398.

I am aware of prior disclosures of corrugated strips as expansion connections in regenerator matrices (U.S. Pat. No. 3,311,204 of Barnard for Torque-Transmitting Means Permitting Relative Radial Expansion and Contraction Between A Pair of Coaxial Driven and Driving Members, March 28, 1967, and U.S. Pat. No. 3,363,478 of Lanning for Driving Means for Rotary Heat Exchangers, January 16, 1968), but these are quite different from my invention.

The detailed description of preferred embodiments of the invention for the purpose of explaining the principles thereof is not to be considered as limiting or restricting the invention, since many modifications may be made by the exercise of skill in the art without departing from the scope of the invention.

I claim:

1. A rotary regenerator matrix comprising, in combination, an annular body of heat transfer material of structure porous to fluid flow through the body and adapted to receive heat from a fluid flowing through the body, store heat, and deliver heat to a fluid flowing through the body, a band extending circumferentially of the body adjacent to but spaced from the surface thereof, and an interconnection coupling the body to the band providing for relative radial expansion of the body and band and effective to transmit torque between the body and band, the interconnection comprising two nested corrugated sheets having corrugations with approximately parallel side walls with the peaks of each sheet radially slidable in the valleys of the other sheet with the side walls slidably engaging, one sheet being coupled to the body and the other to the band.

2. A matrix as defined in claim 1 in which the matrix is of an axial-flow type.

3. A matrix as defined in claim 1 in which the interconnection is radially outward of the said annular body.

4. A matrix as defined in claim 1 including also radially slidable means locating the sheets relatively to each other against axial movement.

5. A matrix as defined in claim 4 in which the said radially slidable means comprises ridges on the side walls of the corrugations.